(12) United States Patent
Hupp et al.

(10) Patent No.: US 10,486,809 B2
(45) Date of Patent: Nov. 26, 2019

(54) UNMANNED AERIAL SYSTEM TARGETING

(71) Applicant: THE BOEING COMPANY, Chicago, IL (US)

(72) Inventors: Ryan L. Hupp, Creve Coeur, MO (US); Sean R. Wakayama, Cypress, CA (US)

(73) Assignee: THE BOEING COMPANY, Chicago, IL (US)

( * ) Notice: Subject to any disclaimer, the term of this patent is extended or adjusted under 35 U.S.C. 154(b) by 245 days.

(21) Appl. No.: 15/293,020

(22) Filed: Oct. 13, 2016

(65) Prior Publication Data
US 2018/0162527 A1 Jun. 14, 2018

(51) Int. Cl.
*G05D 1/00* (2006.01)
*G05D 3/00* (2006.01)
*B64C 39/02* (2006.01)
*F41G 9/00* (2006.01)

(52) U.S. Cl.
CPC .......... *B64C 39/024* (2013.01); *F41G 9/002* (2013.01); *G05D 1/0016* (2013.01); *G05D 1/0038* (2013.01); *B64C 2201/12* (2013.01); *B64C 2201/146* (2013.01)

(58) Field of Classification Search
None
See application file for complete search history.

(56) References Cited

U.S. PATENT DOCUMENTS

| | | | |
|---|---|---|---|
| 3,086,425 A | 4/1963 | Huey | |
| 4,675,677 A * | 6/1987 | von Maydell | G01S 13/90 342/189 |
| 4,681,013 A | 7/1987 | Farley et al. | |
| 4,697,764 A | 10/1987 | Hardy et al. | |
| 5,657,947 A | 8/1997 | Mayersak | |
| 5,683,061 A | 11/1997 | Hardy et al. | |
| 5,775,641 A | 7/1998 | Goon | |
| 5,866,838 A | 2/1999 | Mayersak | |
| 5,984,240 A * | 11/1999 | Shinagawa | G05D 1/085 244/195 |

(Continued)

OTHER PUBLICATIONS

Rogers, 'Will the Government Ban These Drones Equipped with Guns?', Fstoppers; https://fstoppers.com/aerial/will-government-ban-these-drones-equipped-guns-76907; Jul. 21, 2015; (5 pages).

(Continued)

*Primary Examiner* — Bhavesh V Amin
(74) *Attorney, Agent, or Firm* — Moore Intellectual Property Law PLLC

(57) ABSTRACT

An unmanned aerial system (UAS) includes a body and a lift and propulsion system coupled to the body. The UAS includes a weapon coupled to the body. The weapon has an aiming axis oriented in a fixed direction relative to the body. The UAS includes a control system operatively coupled to the lift and propulsion system and the weapon. The control system is configured to determine a roll angle and a flight path such that the aiming axis is directed at a target when the UAS moves according to at least a portion of the flight path at the roll angle. The control system is further configured to control the lift and propulsion system such that the UAS moves according to the at least the portion of the flight path at the roll angle.

20 Claims, 10 Drawing Sheets

(56) References Cited

U.S. PATENT DOCUMENTS

| | | | |
|---|---|---|---|
| 6,460,445 B1 | 10/2002 | Young et al. | |
| 7,218,273 B1* | 5/2007 | Webster, Jr. | G01S 7/4026 342/147 |
| 7,299,130 B2* | 11/2007 | Mulligan | G05D 1/0094 340/961 |
| 7,542,828 B2* | 6/2009 | Steele | B64C 39/024 244/190 |
| 9,776,709 B2* | 10/2017 | Miralles | G05D 1/12 |
| 2007/0023582 A1* | 2/2007 | Steele | B64C 39/024 244/190 |
| 2007/0055417 A1* | 3/2007 | Chatfield | G01C 23/005 701/13 |
| 2010/0044496 A1* | 2/2010 | Gosling | B64C 39/024 244/12.5 |
| 2010/0051741 A1* | 3/2010 | Ismailov | B64C 39/024 244/13 |
| 2010/0198514 A1* | 8/2010 | Miralles | F41G 7/008 701/302 |
| 2010/0282058 A1* | 11/2010 | Nelson | F41A 19/08 89/27.12 |
| 2011/0176129 A1* | 7/2011 | Rastegar | F41G 7/222 356/139.03 |
| 2011/0221692 A1* | 9/2011 | Seydoux | A63H 27/12 345/173 |
| 2012/0044710 A1* | 2/2012 | Jones | B64C 39/024 362/470 |
| 2014/0081505 A1* | 3/2014 | Klinger | G08G 1/162 701/25 |
| 2014/0172200 A1* | 6/2014 | Miralles | G05D 1/12 701/3 |
| 2014/0192193 A1 | 7/2014 | Zufferey et al. | |
| 2015/0108215 A1* | 4/2015 | Ehrlich | G01S 17/88 235/404 |
| 2015/0136897 A1* | 5/2015 | Seibel | B64C 29/0033 244/6 |
| 2017/0158320 A1* | 6/2017 | Bosch | B64C 27/52 |
| 2018/0162527 A1* | 6/2018 | Hupp | B64C 39/024 |

OTHER PUBLICATIONS

Theodorakopoulos et al., 'A strategy for tracking a ground target with a UAV', Conference Paper • Oct. 2008; IEEE Xplore Conference: Intelligent Robots and Systems; (6 pages).

Humphries, 'Quadcopter modified to carry machine gun'; http://www.geek.com/geek-cetera/ ; Apr. 23, 2012; (3 pages).

'AC-130A/E/H/U—Gunship', http://www.c-130.net/c-130-versions-article3.html; 2016, (7 pages).

U.S. Appl. No. 15/278,730, filed Sep. 28, 2016; (61 pages).

Koebler, "The Next Gun Debate? Armed Drones Could Be Protected by the Second Amendment", U.S. News, May 21, 2013, 13 pages.

Nieuwint, "Lockheed AC-130 Gunship: Death From Above", War History Online, Military Vehicles, Nov. 4, 2015, 5 pages.

* cited by examiner

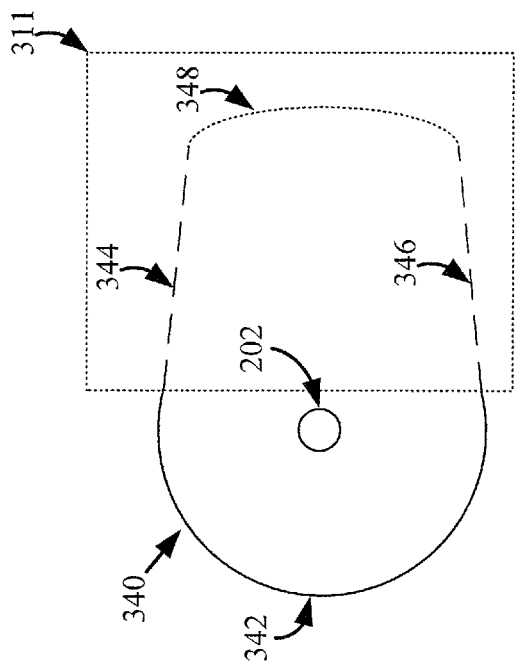
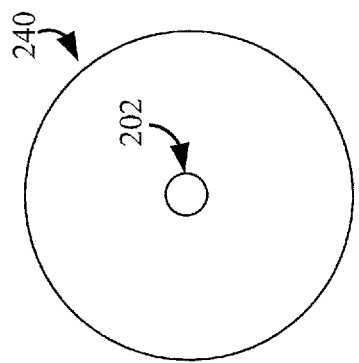

UNMANNED AERIAL SYSTEM TARGETING

FIELD OF THE DISCLOSURE

The present disclosure relates to unmanned aerial system combat maneuvering.

BACKGROUND

Manned aircraft may be used to attack a target using a weapon coupled to the aircraft. Attacking the target using a weapon coupled to the manned aircraft subjects the aircraft and its passengers or crew to counter attack. For example, a manned aircraft may include a forward-facing weapon. To aim the weapon at the target during flight, the aircraft crew flies the aircraft toward the target, resulting in a strafing attack profile that may result in the aircraft flying close to (e.g., over) the target, rendering the aircraft and its passengers or crew vulnerable to attack.

SUMMARY

In a particular implementation, an unmanned aerial system (UAS) includes a body and a lift and propulsion system coupled to the body. The UAS includes a weapon coupled to the body. The weapon has an aiming axis oriented in a fixed direction relative to the body. The UAS includes a control system operatively coupled to the lift and propulsion system and the weapon. The control system is configured to determine a roll angle and a flight path such that the aiming axis is directed at a target when the UAS moves according to at least a portion of the flight path at the roll angle. The control system is further configured to control the lift and propulsion system such that the UAS moves according to the flight path at the roll angle.

In a particular implementation, a system for aiming at a target includes a remote control station. The remote control station is configured to display an image to an operator and to receive an input from the operator indicating that the image includes a representation of a target to generate an indication of a physical location of the target. The system includes a UAS including a body and a lift and propulsion system coupled to the body. The UAS includes a weapon coupled to the body. The weapon has an aiming axis oriented in a fixed direction relative to the body. The UAS includes a control system operatively coupled to the lift and propulsion system and the weapon. The control system is configured to receive the indication of the physical location of the target from the remote control station. The control system is further configured to determine, based at least in part on the indication of the physical location of the target, a roll angle and a flight path such that the aiming axis is directed at the target when the UAS moves according to at least a portion of the flight path at the roll angle. The control system is further configured to control the lift and propulsion system such that the UAS moves according to the flight path at the roll angle.

In another particular implementation, a method includes determining, by a control system of an unmanned aerial system (UAS), a roll angle and a flight path such that an aiming axis of a weapon of the UAS is directed at a target when the UAS moves according to at least a portion of the flight path at the roll angle. The weapon is coupled to a body of the UAS such that the aiming axis is oriented in a fixed direction relative to the body. The method further includes controlling a lift and propulsion system of the UAS such that the UAS moves according to the flight path at the roll angle.

The features, functions, and advantages described herein can be achieved independently in various embodiments or may be combined in yet other embodiments, further details of which are disclosed with reference to the following description and drawings.

BRIEF DESCRIPTION OF THE DRAWINGS

FIG. 2 illustrates an overhead view of a graphical representation of an example of the flight path of FIG. 1 about a target;

FIG. 3 illustrates an overhead view of a graphical representation of an example of the flight path of FIG. 1 that includes a circular portion about a target and includes a non-circular portion;

DETAILED DESCRIPTION

Figure 1:
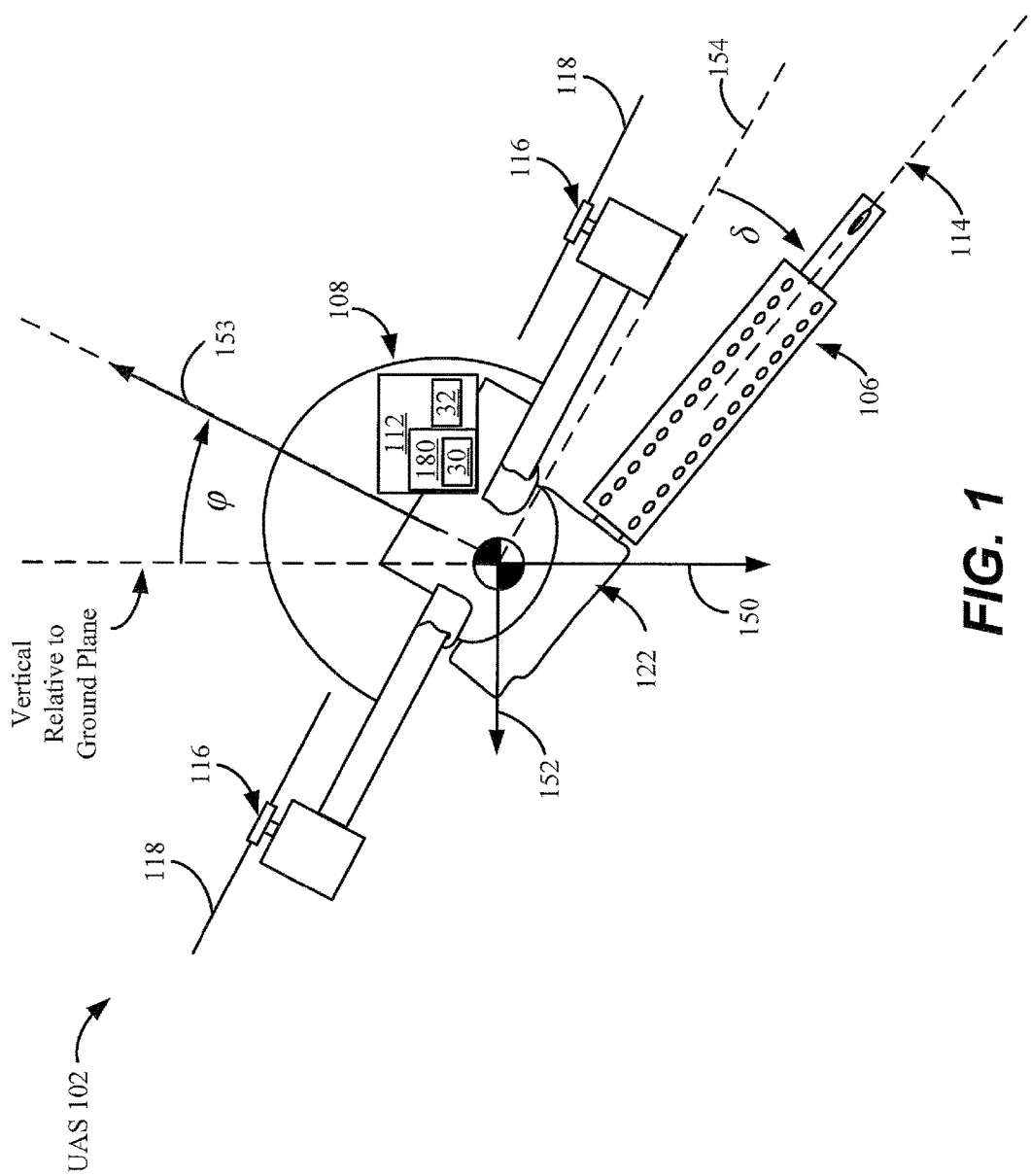
FIG. 1 illustrates an example of an unmanned aerial system (UAS) that includes a control system configured to determine a flight path and a roll angle such that an aiming axis of a fixed-position weapon coupled to the UAS is directed at the target when the UAS moves according to at least a portion of the flight path.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Implementations disclosed herein enable aiming a fixed-position weapon mounted on an unmanned aerial system (UAS) (e.g., an unmanned aerial vehicle (UAV)) at a target by rolling (e.g., banking) the UAS at a particular roll angle (e.g., bank angle) while the UAS moves according to a flight path. In a particular implementation, the flight path may be or include a complete circle or a portion of a circle and the determined roll angle may be constant throughout the complete circle or the portion of the circle. In this implementation, a flight vector direction of the UAS at any point along the complete circle or the portion of the circle is tangent to the flight path. Further, in this implementation, an aiming axis of the weapon may be substantially perpendicular to the flight vector direction, and moving the UAS along the complete circle or the portion of the circle at the constant roll angle results in the aiming axis being directed at the target at all points along the complete circle or the portion of the circle.

The particular roll angle and the flight path are determined by a control system of the UAS or are determined by a remote control station and transmitted to the UAS. In a particular implementation, the control system of the UAS determines the roll angle and/or the flight path based on one or more flight parameters that the UAS is to maintain relative to the target when the UAS moves according to the flight path. The one or more flight parameters may be determined based on one or more flight parameter guidelines. As examples, the one or more flight parameter guidelines may include a minimum altitude parameter guideline indicative of a minimum altitude relative to the target, a minimum range parameter guideline indicative of a minimum range to the target, a minimum orbit radius parameter guideline indicative of a minimum orbit radius centered at the target, or a minimum velocity parameter guideline indicative of a minimum velocity for the UAS. The one or more flight parameter guidelines may be stored in a memory of the UAS (e.g., while the UAS is grounded) or may be received by the UAS from a remote control station (e.g., while the UAS is in flight).

FIG. 1 illustrates a free body diagram of an example of a UAS 102 that includes a weapon 106. The UAS 102 is configured to determine a roll angle 32 and a flight path 180 (e.g., a calculated or determined flight path) to aim a weapon 106 of the UAS 102 at a target, such as the target 202 of FIGS. 2-4, 6, and 7 or the target 706 of FIG. 7. In some implementations, the UAS 102 is a fixed wing UAS. In other implementations, the UAS 102 is a multi-rotor UAS. Any rotorcraft, including those with main and tail rotors, may be used. In some implementations, the multi-rotor UAS includes at least three rotors (e.g., four, six, or eight rotors). For example, the UAS 102 may be a quadcopter. One or more rotors of the multi-rotor UAS may include a fixed-pitch blade. In these examples, the UAS 102 is maneuvered by controlling a rotational speed of the fixed-pitch blades. Alternatively, in some implementations, one or more rotors of the multi-rotor UAS may be a variable-pitch blade. For example, the multi-rotor UAS may employ a collective pitch control, an individual pitch control, or a combination thereof.

The UAS 102 includes a body 108. The body 108 may include a fuselage of a fixed wing UAS, and the weapon 106 is coupled to the body 108. Alternatively or additionally, the body 108 may be the weapon 106 such that the weapon 106 is coupled directly to a lift and propulsion system 116, such as to the rotors 118 or to supports of the rotors 118.

The UAS 102 includes the lift and propulsion system 116 coupled to the body 108. For example, when the UAS 102 is a multi-rotor UAS, the lift and propulsion system 116 may correspond to or include rotors of the multi-rotor UAS (e.g., may include rotors 118). Alternatively or additionally, when the UAS 102 is a fixed-wing UAS, the lift and propulsion system 116 may correspond to the wings (e.g., which provide lift) of the fixed wing UAS and one or more engines or propellers (e.g., that provide propulsion).

In some examples, the weapon 106 is a firearm, such as a mechanically mounted or coupled assault rifle (e.g., automatic or semiautomatic assault rifle). The weapon 106 may be mounted on or coupled to the body 108 using a fixed position mount 122 (e.g., the weapon 106 is a fixed-position weapon when mounted on or coupled to the body 108). When coupled to the body 108 using the fixed position mount 122, the weapon 106 has an aiming axis 114 oriented in a fixed direction relative to the body 108 (e.g., relative to a body reference frame). The aiming axis 114 forms an angle $\delta$ (e.g., a declination angle) with a horizontal plane (e.g., of a UAS 102 body 108-fixed reference frame, of a local level reference frame, or of a navigational frame of reference when the UAS 102 has a roll angle $\varphi$ of zero degrees). In the example illustrate in FIG. 1, the arrow 150 corresponds to a direction of the force of gravity on the UAS 102, the arrow 152 corresponds to a horizontal plane of a navigational frame of reference and a direction of centripetal acceleration of the UAS 102 as the UAS 102 flies in a circle, and the dashed line 154 corresponds to a body 108-fixed horizontal plane. Additionally, in the example illustrated in FIG. 1, the arrow 153 corresponds to a thrust vector (in a direction of a body 108-fixed vertical plane) that may be determined to cancel the force of gravity and the centripetal acceleration.

The UAS 102 includes a control system 112 operatively coupled to the lift and propulsion system 116 and to the weapon 106. The control system 112 is configured to determine the roll angle 32 and the flight path 180 such that the aiming axis 114 is directed at the target when the UAS 102 moves according to at least a portion 30 of the flight path 180 at the roll angle 32. For example, the flight path 180 may be circular (e.g., may form a complete circle) in which case the entire flight path 180 may be considered as corresponding to the at least the portion 30 of the flight path 180. To illustrate, FIG. 2 shows an overhead view of a graphical representation 240 of a first example of the flight path 180 of FIG. 1 about a target 202. In this example, the at least the portion 30 of the flight path 180 corresponds to the entire flight path 180. Alternatively or additionally, the flight path 180 may include a circular portion and a non-circular portion, in which case the circular portion may correspond to the at least the portion 30 of the flight path 180 and the non-circular portion may correspond to a second portion, such as the second portion 311 of FIG. 3. The non-circular or second portion of the flight path 180 may include any flight path that does not have a constant radius, such as a curved, straight, variable radius, etc. portion. As an example, FIG. 3 illustrates an overhead view of a graphical representation 340 of a second example of the flight path 180 of FIG. 1 including a circular portion 342 and a non-circular portion (e.g., 344, 346, and 348). In this example, the circular portion 342 corresponds to the at least the portion 30 of the flight path 180 and the non-circular portion 344, 346, and 348 corresponds to the second portion 311.

In some implementations, the control system 112 is configured to control a pose of the UAS 102 such that the aiming axis 114 is substantially perpendicular to the flight vector direction when the UAS 102 moves according to the at least the portion 30 of the flight path 180 (e.g., the aiming axis 114 is "side-facing"). Thus, in these implementations, the aiming axis 114 is not substantially co-linear or parallel to a flight vector direction of the UAS 102 while the UAS 102 moves according to the at least the portion 30 of the flight path 180. The side-facing nature of the aiming axis 114 when the UAS 102 moves according to the at least the portion 30 of the flight path 180 and the circular shape of the at least the portion 30 of the flight path 180 enables the UAS 102 to aim at the target at each point along the at least the portion 30 of the flight path 180 without the UAS 102 moving toward the target while moving according to the at least the portion 30 of the flight path 180.

The control system 112 is configured to determine the flight path 180 based on determined flight parameters relative to the target and based on a location of the target. The determined parameters relative to the target include first parameters, such as the first parameters 413 of FIG. 4. The first parameters include parameters that the UAS 102 is to maintain relative to the target while the UAS 102 moves according to the at least the portion 30 of the flight path 180, such as an altitude, a change in altitude, an orbit radius, a change in orbit radius, a slant range to the target, a change in slant range to the target, or a combination thereof. When the flight path 180 includes a non-circular portion, such as the second portion 311, the determined parameters relative to the target additionally include second parameters, such as the second parameters 415 of FIG. 4, that describe the non-circular portion of the flight path 180 relative to the target (e.g., an altitude, a change in altitude, a slant range to the target, a change in slant range to the target, or a combination thereof).

The first parameters include an altitude parameter and an orbit radius parameter indicative of an altitude and orbit radius (relative to the target) for the UAS 102 when the UAS 102 moves according to the at least the portion 30 of the flight path 180. In some implementations, the UAS 102 maintains a substantially constant distance from the target when the UAS 102 moves according to the at least the portion 30 of the flight path 180 (e.g., the at least the portion 30 of the flight path 180 is circular about the target). For example, the at least the portion 30 of the flight path 180 may be determined such that UAS 102 maintains a relatively constant altitude relative to the target and maintains a relatively constant ground range relative to the target when the UAS 102 moves according to the at least the portion 30 of the flight path 180.

The values of the altitude parameter and the orbit radius parameter may be calculated using Equations 1, 2, 3, 4, and/or 5, where δ is the declination angle of the weapon 106 (shown in FIG. 1), h is an altitude of the UAS 102 relative to the target, r is an orbit radius centered at the target, ρ is a slant range from the UAS 102 to the target (e.g., $\rho = \sqrt{h^2 + r^2}$), g is acceleration due to gravity, v is a velocity of the UAS 102, and φ is the roll angle of the UAS 102 (shown in FIG. 1).

$$h = \rho \sin(\varphi + \delta) \quad \text{Equation 1}$$

$$r = \rho \cos(\varphi + \delta) \quad \text{Equation 2}$$

$$v = \sqrt{gr \tan \varphi} \quad \text{Equation 3}$$

$$\rho = \sqrt{h^2 + r^2} \quad \text{Equation 4}$$

$$h = r \tan(\varphi + \delta) \quad \text{Equation 5}$$

Additionally, the roll angle 32 and the velocity for the UAS 102 as the UAS 102 moves according to the at least the portion 30 of the flight path 180 may be determined based on Equations 1, 2, 3, 4, and/or 5.

Figure 4:
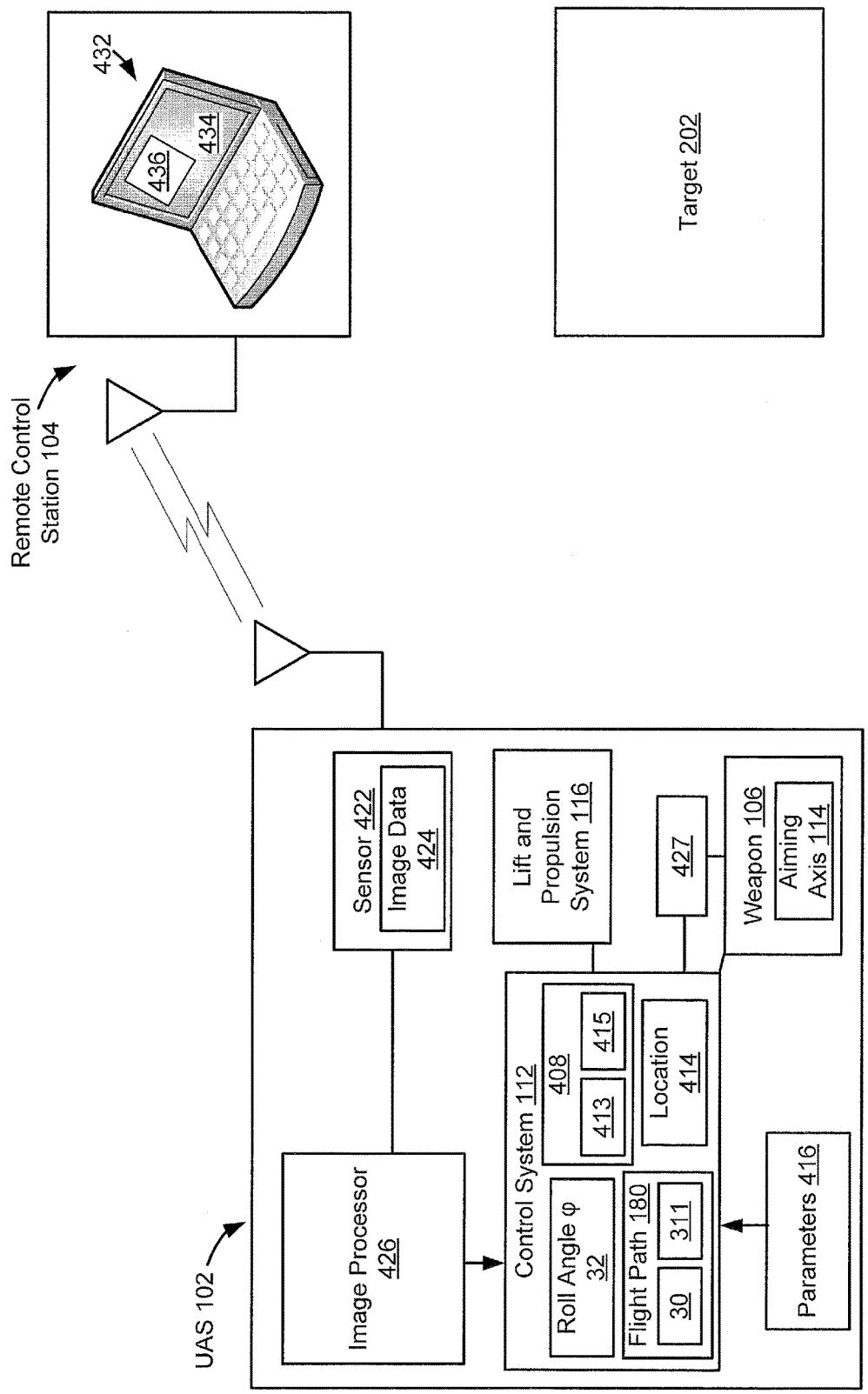
FIG. 4 illustrates a block diagram of an example of the UAS of FIG. 1, a target, and a remote control station.
Figure 5:
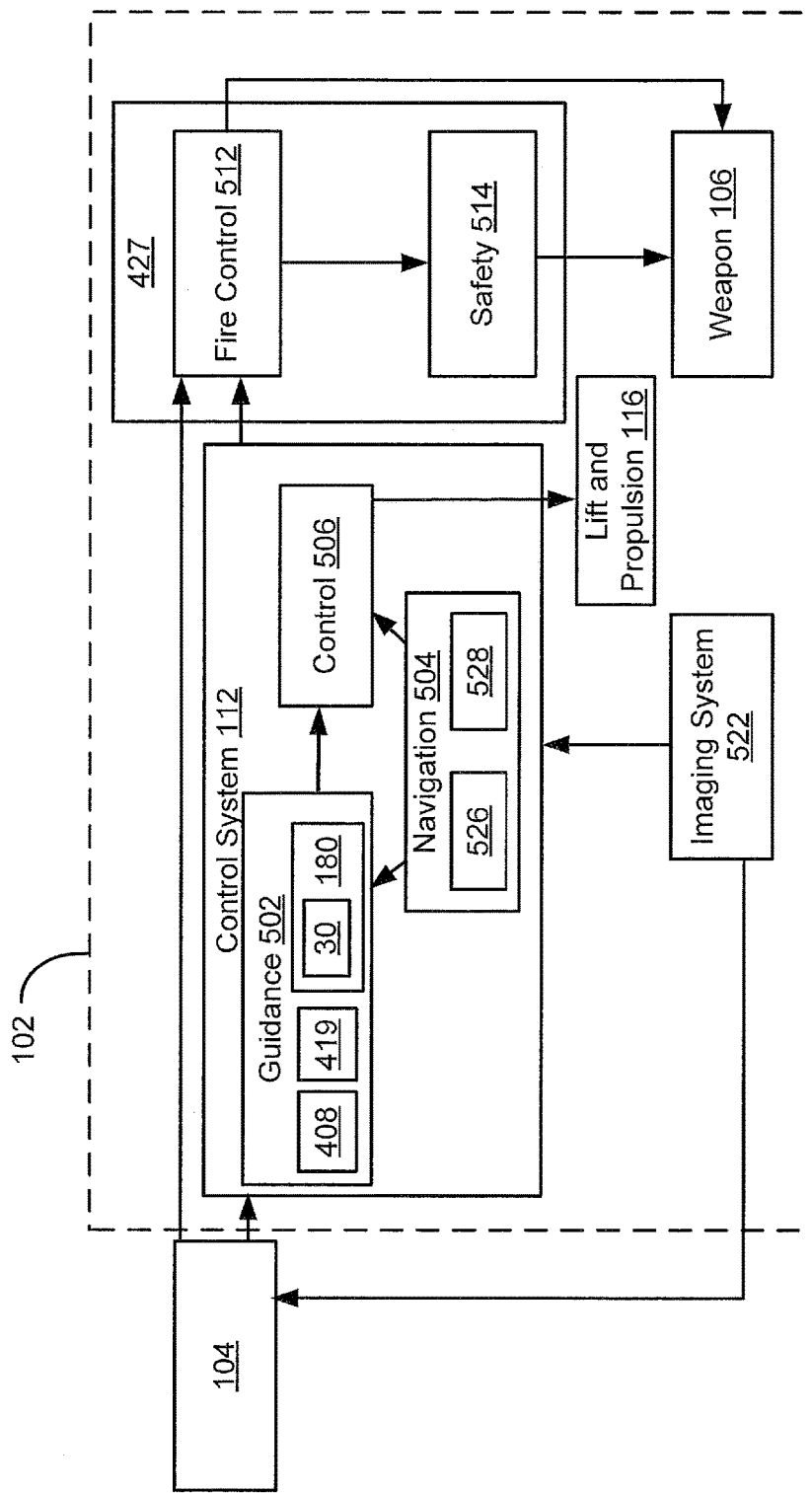
FIG. 5 illustrates a control diagram of example systems of the UAS of FIG. 1 and a remote control station.

The roll angle 32, the velocity, and the first parameters may be determined (e.g., calculated) based on one or more first flight parameter guidelines (e.g., one or more engagement parameters and/or rules), such as the flight parameter guidelines 416 of FIG. 4, received by the UAS 102 from a remote control station (e.g., while the UAS 102 is in flight) such as the remote control station 104 of FIGS. 4 and 5, one or more first flight parameter guidelines, such as the flight parameter guidelines 416 of FIG. 4, stored in a memory of the UAS 102 (e.g., while the UAS 102 is grounded), or a combination thereof. The one or more first flight parameter guidelines may include minimum values associated with the first parameters, maximum values associated with the first parameters, or a combination thereof. For example, the one or more first flight parameter guidelines received or stored by the UAS 102 include a minimum altitude parameter guideline indicative of a minimum altitude that the UAS 102 is to maintain relative the target, a minimum range (e.g., slant range) parameter guideline indicative of a minimum range that the UAS 102 is to maintain relative to the target, a minimum orbit radius parameter guideline indicative of a minimum orbit radius centered at the target that the UAS 102 is to maintain, a minimum velocity guideline indicative of a minimum velocity that the UAS 102 is to maintain, or a combination thereof. As another example, the one or more first flight parameter guidelines received or stored by the UAS 102 may include a minimum and maximum altitude relative the target, a minimum and maximum range (e.g., slant range) relative to the target, a minimum and maximum orbit radius centered at the target, a minimum and maximum velocity for the UAS 102, or a combination thereof. The minimum values may be determined based on detection or defensive considerations to minimize or limit exposure of the UAS 102 to attack. The maximum values may be determined based on capabilities of the UAS 102. For example, the maximum values may be based on a maximum effective range of the weapon 106.

In some implementations, the one or more first flight parameter guidelines include minimum values as described above and the one or more first parameters are determined by using the minimum values and the Equations 1, 2, 3, 4, and/or 5. To illustrate, the one or more first flight parameter guidelines that are received or stored by the UAS 102 include the minimum altitude parameter guideline and the minimum range parameter guideline. The UAS 102 (e.g., the control system 112) calculates the first parameters based on the minimum altitude parameter guideline and the minimum range parameter guideline by solving one or more of the Equations 1, 2, 3, 4, and/or 5 using values indicated by or derived from the minimum altitude parameter guideline and the minimum range parameter guideline. To illustrate, the control system 112 receives (e.g., from a remote control station) a minimum altitude parameter guideline indicative of a minimum altitude of 300 feet (91.4 meters (m)) and a minimum range parameter guideline indicative of a minimum range to target of 450 feet (137.2 m). The control system 112 determines an altitude parameter of the first parameters to be 300 feet (91.4 m) based on the value of the 300 feet (91.4 m) indicated by the stored or received minimum altitude parameter guideline. The control system 112 solves the Equation 1 using a stored value of the declination angle δ, the range to target value of 450 feet (137.2 m), and the altitude value of 300 feet (91.4 m) to determine a roll angle that the UAS 102 is to maintain as the UAS 102 moves according to the at least the portion 30 of the flight path 180. The control system 112 subsequently solves the Equation 2 using the determined roll angle, the stored value of the declination angle δ, and the range to target value of 450 feet (137.2 m) to determine an orbit radius parameter of the first parameters. The control system 112 may also calculate a velocity for the UAS 102 based on Equation 3 using the determined roll angle and orbit radius parameter.

As another example, the one or more first flight parameter guidelines that are received or stored by the UAS 102 include a minimum orbit radius parameter guideline and a minimum velocity parameter guideline. In this example, the control system 112 calculates the roll angle 32, the velocity, and the first parameters based on the minimum orbit radius parameter guideline and the minimum velocity parameter guideline. To illustrate, the control system 112 receives (e.g., from a remote control station) a minimum velocity parameter guideline indicative of a minimum velocity of X feet per second and a minimum orbit radius parameter guideline indicative of a minimum orbit radius parameter of 500 feet (152.4 m). The control system 112 determines a velocity of X feet per second (that the UAS 102 is to maintain while the UAS 102 moves according to the at least the portion 30 of the flight path 180) based on the value of X feet per second indicated by the received or stored minimum velocity parameter guideline. The control system 112 additionally determines an orbit radius parameter of the first parameters to be 500 feet (152.4 m) based on the value of 500 feet (152.4 m) indicated by the received or stored minimum orbit radius parameter guideline. The control system 112 may solve the Equation 3 using the orbit radius parameter value of 500 feet (152.4 m) and the velocity value of X feet per second to determine a roll angle 32 that the UAS 102 is to maintain when the UAS 102 moves according to the at least the portion 30 of the flight path 180. The control system 112 may subsequently solve the Equations 1 and 4 to determine an altitude parameter of the first parameters using the determined roll angle, the stored value of the declination angle δ, and a range to target value corresponding to the square root of the altitude parameter squared plus the orbit radius parameter value of 500 feet (152.4 m) squared. Alternatively or additionally, the control system 112 solves the Equation 5 to determine the altitude parameter using the orbit radius value of 500 feet (152.4 m), the determined roll angle, and the stored value of the declination angle δ.

In other implementations, the one or more first flight parameter guidelines include minimum and maximum values as described above, and the first parameters are determined by selecting values within a range of values defined by the minimum and maximum values and solving one or more of the Equations 1, 2, 3, 4, and/or 5 for any remaining parameters of the first parameters. In some examples, one or more of the values within the ranges may be selected based on pilot or other input. In other examples, one or more of the values within the ranges may be randomly selected.

To illustrate, the one or more first flight parameter guidelines that are received or stored by the UAS 102 include guidelines indicative of minimum and maximum altitudes relative to the target and minimum and maximum ranges relative to the target. The UAS 102 (e.g., the control system 112) may determine (e.g., calculate) the first parameters based on the minimum and maximum altitudes and the minimum and maximum ranges. To illustrate, the control system 112 receives (e.g., from a remote control station) a minimum altitude parameter guideline indicative of a minimum altitude of 300 feet (91.4 m) and a maximum altitude parameter guideline indicative of a maximum altitude of 450 feet (137.2 m). The control system 112 may determine an altitude parameter of the first parameters to be 450 feet (137.2 m) by selecting a value within the altitude range (e.g., 300-450 feet or 91.4-137.2 m) defined by the minimum and maximum altitudes.

In some implementations, the control system 112 selects an altitude value within the altitude range (e.g., 300-450 feet or 91.4-137.2 m) based on operator input from a remote control station. Alternatively or additionally, in some implementations, the control system 112 randomly selects an altitude value within the altitude range (e.g., 300-450 feet or 91.4-137.2 m). Alternatively or additionally, in some implementations, the control system 112 selects a current altitude of the UAS 102 when the current altitude of the UAS 102 is within the altitude range (e.g., 300-450 feet or 91.4-137.2 m). Alternatively or additionally, in some implementations, the control system 112 selects a limit (e.g., 300 feet or 450 feet or 91.4 m or 137.2 m) of the altitude range (e.g., 300-450 feet or 91.4-137.2 m) when the UAS 102 is not within the altitude range (e.g., 300-450 feet or 91.4-137.2 m). As an example, when the UAS 102 operates at an altitude of 500 feet (152.4 m) and the altitude range corresponds to 300-450 feet (e.g., or 91.4-137.2 m), the control system 112 is configured to select an altitude of 450 feet (137.2 m) because 450 feet (137.2 m) is the limit of the altitude range that is nearest to the current altitude of the UAS 102 (e.g., the difference between 500 and 450 (or 152.4 and 137.2) is less than the difference between 500 and 300 (or 152.4 and 91.4)).

The control system 112 may additionally receive a minimum range parameter guideline indicative of a minimum slant range of 550 feet (167.6 m) and a maximum range parameter guideline indicative of a maximum slant range of 700 feet (213.4 m). The control system 112 may select a value of 625 feet (190.5 m) within the range (550-700 feet or 167.6-213.4 m) defined by the minimum and maximum ranges (e.g., may select a "selected slant range"). The control system 112 may solve the Equation 1 using a stored value of the declination angle δ, the selected slant range of 625 feet (190.5 m), and the altitude value of 350 feet (106.7 m) to determine a roll angle that the UAS 102 is to maintain as the UAS 102 moves according to the at least the portion 30 of the flight path 180. The control system 112 may subsequently solve the Equation 2 using the determined roll angle, the stored value of the declination angle δ, and the range to target value of 550 feet (167.6 m) to determine an orbit radius parameter of the first parameters. The control system 112 may also calculate a velocity for the UAS 102 based on the Equation 3 using the determined roll angle and orbit radius parameter.

Thus, the UAS 102 may determine (e.g., calculate) a roll angle 32, a velocity, and/or first parameters that the UAS 102 is to maintain relative to the target when the UAS 102 moves according to a portion 30 of a flight path 180 such that the aiming axis 114 of the weapon 106 is directed at the target (at every point along the at least the portion of the flight path) when the UAS 102 moves according to the at least the portion 30 of the flight path 180. The roll angle 32, the velocity, and/or the first parameters may be determined based on one or more flight parameter guidelines that are received or stored by the UAS 102.

As described above with reference to FIGS. 1 and 3, the determined flight path 180 may include a second (e.g., non-circular) portion 311 in addition to the at least the portion 30. The second portion 311 of the flight path 180 may be determined to enable the UAS 102 to take evasive maneuvers, re-group, reset an attack pattern, or avoid an obstacle. To illustrate, the second portion 311 may correspond to the non-circular portion 344, 346, and 348 of FIG. 3. When the flight path 180 includes the second portion 311, the determined parameters relative to the target include second parameters that describe the second portion 311 of the flight path 180 relative to the target. The second parameters may be determined based on the one or more first flight parameter guidelines and based on one or more second flight parameter guidelines received or stored by the UAS 102. To illustrate, the one or more second flight parameter guidelines may include a location parameter guideline indicative of a location relative to the target that the UAS 102 is to move toward, away from, and/or around when the UAS 102 flies the second portion 311. Additionally, the one or more second flight parameters may include a minimum and maximum range parameter guideline indicative of ranges from the target that the UAS 102 is allowed to achieve when the UAS 102 flies the second portion 311. The UAS 102 may determine a length and direction of the straight portions 344 and 346 of FIG. 3 relative to the target based on the minimum and maximum range parameter guideline and the location parameter guideline. The second parameters may additionally or alternatively be determined to enable efficient movement of the UAS 102 between parts or legs of the second portion 311. To illustrate, the control system 112 may calculate parameters that define the second portion of the flight path relative to the target to include the curved portion 348 of FIG. 3 such that the curved portion 348 enables the UAS 102 to efficiently move from the straight portion 344 to the straight portion 346.

Thus, the UAS 102 may determine (e.g., calculate) parameters that define a second (e.g., a non-circular) portion 311 of the flight path 180. The second portion 311 of the flight path 180 may enable the UAS 102 to take evasive maneuvers, re-group, reset an attack pattern, avoid obstacles, or a combination thereof. The UAS 102 may therefore be configured to determine parameters of a flight path (relative to a target) 180 that includes a circular portion and a non-circular portion such that the aiming axis 114 of the weapon 106 of the UAS 102 is directed at the target while the UAS 102 moves according to the circular portion and such that the non-circular portion enables the UAS 102 to take evasive maneuvers, re-group, reset an attack pattern, avoid obstacles, or a combination thereof.

The UAS 102 (e.g., the control system 112) may determine the flight path 180 based on a location (e.g., a UAS 102-referenced, target-referenced, or geo-referenced location or position), such as the location 414 of FIG. 4, of the target and based at least in part on the determined parameters relative to the target. For example, the UAS 102 may determine the at least the portion 30 of the flight path 180 based on the first parameters and based on a location 414 of the target. Additionally, when the flight path 180 includes a second portion 311 as described above, the UAS 102 may determine the second portion 311 of the flight path 180 based on the second parameters and based on the location 414 of the target.

In some examples, the location 414 of the target is determined by the control system 112 as described in more detail below with reference to FIG. 4. Alternatively or additionally, the location 414 of the target may be determined by a remote control station as described in more detail below with reference to FIG. 4.

In some examples, the location 414 of the target is defined by a latitude, a longitude, and an altitude above sea level (e.g., the location may be geo-referenced). In these examples, the control system 112 determines the flight path 180 based on the latitude and the longitude of the target, the altitude above sea level of the target, and the determined parameters relative to the target (e.g., the first parameters and/or the second parameters). To illustrate, the first parameters may include an orbit radius of 500 feet (152.4 m) as described above, and the control system 112 may determine the at least the portion 30 of the flight path 180 such that the UAS 102 maintains a ground range of 500 feet (152.4 m) from the latitude and longitude of the target. Additionally, the first parameters may include an altitude, and the control system 112 may determine the at least the portion 30 of the flight path 180 such that the UAS 102 maintains an altitude corresponding to the altitude above (or below) sea level of the target plus the determined altitude. In some examples, the target may be moving, in which case the UAS 102 receives or dynamically determines updated locations of the target to track the target as it moves. In these examples, the UAS 102 maintains the ground range and the altitude based on the most recently received or determined latitude, longitude, and altitude of the target.

Thus, the UAS 102 may determine the flight path based 180 on a determined location 414 of the target and based on one or more parameters 408 relative to the target that are determined by the UAS 102. Although the UAS 102 is depicted as determining the flight path 180, in other implementations, the remote control station may determine the flight path 180 as described above with reference to operations or functions performed by the UAS 102, and the flight path 180 may be transmitted from the remote control station to the UAS 102.

The control system 112 is configured to control the lift and propulsion system 116 such that the UAS 102 moves according to the flight path 180. For example, the control system 112 is configured to control the lift and propulsion system 116 such that the UAS 102 moves according to the at least the portion 30 of the flight path 180 at the roll angle 32, resulting in the aiming axis 114 of the weapon 106 being directed at the target. For example, the control system 112 includes a guidance module, such as the guidance module 502 of FIG. 5, a navigation module, such as the navigation module 504 of FIG. 5, and a control module, such as the control module 506 of FIG. 5. The navigation module 504 may include a sensor (e.g., an inertial measurement unit), such as the sensor 526 of FIG. 5, or a global positioning system (GPS) module, such as the GPS module 528 of FIG. 5, and may be configured to determine a state vector for the UAS 102 based on information from the sensor 526 or the GPS module 528. The guidance module 502 is configured to determine a trajectory based on the determined flight path 180 and the state vector from the navigation module 504. The trajectory may be provided to a control module 506 that is configured to determine parameters or configurations of one or more components of the UAS 102 to cause the UAS 102 to fly according to the trajectory. For example, when the UAS 102 is a multi-rotor UAS, the control module 506 determines a rotation speed for the rotors to obtain the trajectory, and may provide control signals to motors coupled to the rotors, thereby causing the UAS 102 to fly according to the trajectory based on the determined flight path. As another example, when the UAS 102 is a fixed-wing UAS, the control module 506 determines flight surface configurations and engine throttle or power setting to obtain the trajectory, and provides control signals to actuators coupled to the flight surfaces and to one or more engines of the UAS 102, thereby causing the UAS 102 to fly according to the trajectory. Additionally, the control system 112 is configured to control the lift and propulsion system 116 to cause the UAS 102 to be oriented in a pose of the UAS 102 such that the aiming axis 114 is substantially perpendicular to the flight vector direction when the UAS 102 moves according to the at least the portion 30 of the flight path 180 (e.g., the aiming axis 114 is "side-facing") as described above.

Thus, the UAS 102 is configured to determine, and move according to, a flight path 180 that includes at least a portion 30 that is circular (e.g., such as the entire flight path graphically illustrated by the representation 240 of FIG. 2 or such as the portion 342 of FIG. 3). The UAS 102 is configured to move according to the flight path 180 about the target at a determined roll angle 32 and such that the aiming axis 114 is substantially perpendicular to the flight vector direction while the UAS 102 moves according to the portion 30. When the UAS 102 moves according to the portion 30 at the roll angle 32 with the aiming axis 114 substantially perpendicular to the flight vector direction of the UAS 102, the weapon 106 is aimed at the target without the UAS 102 approaching the target, thereby enabling an attack profile that allows the weapon 106 to be fired for a longer time compared to aircraft that employ a forward facing aiming axis (e.g., which results in a strafing attack provide that allows the forward facing weapon to be fired for only a limited time before the aircraft has to break off to avoid flying into the target). Additionally, the side-facing nature of the aiming axis 114 enables the UAS 102 to fire at the target while maintaining a greater distance from the target compared to aircraft that employ forward facing weapons that may result in the vehicle having to fly close over the target. Therefore, the determined flight path 180, the determined roll angle 32, and the side-facing nature of the aiming axis 114, in conjunction, enable the UAS 102 to fire at the target for longer and with reduced exposure to attack as compared to aircraft that employ a forward-facing weapon.

FIG. 4 illustrates an example block diagram of a target 202 and of the UAS 102 of FIG. 1 configured to communicate with a remote control station 104. The UAS 102 includes the weapon 106 having the aiming axis 114, a firing system 427, the lift and propulsion system 116, and the control system 112 described above with reference to FIG. 1. As described in more detail below with reference to FIG. 5, the firing system 427 is configured to fire the weapon 106 (e.g., based on input from the remote control station 104).

The control system 112 is configured to determine a roll angle φ 32 and a flight path 180. The flight path 180 includes at least a portion 30 (e.g., described above with reference to FIGS. 1-3) such that the aiming axis 114 of the weapon 106 is directed at the target 202 when the UAS 102 moves according to the at least the portion 30. Alternatively or additionally, in some examples, the flight path 180 includes a second portion (e.g., a non-circular portion) 311 described above with reference to FIGS. 1 and 3. The control system 112 may be configured to determine the flight path 180 based on a location 414 of the target 202 and based on determined parameters 408 relative to the target 202. Alternatively, the remote control station 104 may determine the flight path 180 by performing operations and functions described above and/or below with reference to the UAS 102, and the flight path 180 determined by the remote control station 104 may be transmitted to the UAS 102.

The determined parameters 408 relative to the target 202 include first parameters (e.g., first parameters 413) as described above with reference to FIG. 1. Additionally or alternatively, when the flight path 180 includes the second portion 311, the determined parameters 408 include second parameters (e.g., second parameters 415) as described above with reference to FIGS. 1 and 3. The parameters 408 may be determined based on one or more flight parameter guidelines 416 received or stored by the UAS 102 as described above with reference to FIGS. 1-3.

The location 414 of the target 202 may be determined by the UAS 102. For example, the UAS 102 may include a sensor (e.g., an imaging sensor, such as a camera) 422 configured to obtain image data 424 of a scene including the target 202. The UAS 102 may include an image processor 426 that is configured to receive the image data 424 from the sensor 422. The image processor 426 may process the image data 424 to identify the target 202. For example, the image processor 426 may employ a binary large object image processing technique to process the image data 424 to identify the target 202. The UAS 102 (e.g., the image processor 426) may subsequently use an image processing technique to determine the location 414 or position of the identified target.

Alternatively, the UAS 102 may be configured to transmit the image data 424 to the remote control station 104. The remote control station 104 may receive and process the image data 424 to display an image 434 of the scene including the target 202 on a display 432 (e.g., to display the image 434 including a representation 436 of the target 202). An operator may identify the target 202 by tagging the representation 436 of the target 202. The operator may tag the representation 436 by providing input at a location of the display 432 corresponding to the representation 436 of the target 202. For example, the operator may scroll a cursor over the representation 436 of the target 202 and provide input to designate (e.g., tag) the representation 436 of the target 202. As another example, the display 432 may be a touchscreen display and the operator may tag the representation 436 of the target 202 by touching the display at a location of the representation 436. The remote control station 104 may transmit an indication of the target 202 or the representation 436 of the target 202 in the image 434 to the UAS 102, and the UAS 102 may use an image processing technique to process the image data 424 to determine the location 414 of the target 202 (e.g., a geo-referenced or UAS-referenced location).

Alternatively, the location 414 of the target 202 may be determined based on an indication of the location 414 of the target 202 received by the UAS 102 from the remote control station 104. For example, the UAS 102 may obtain the image data 424 of the scene including the target 202 and may transmit the image data 424 to the remote control station 104. The remote control station 104 may process the image data 424 to display an image 434 of the scene on the display 432. An operator may identify the target 202 by providing input at a location of the display 432 corresponding to the representation 436 of the target 202 as described above. The remote control station 104 may employ an image processing technique to identify a location 414 of the target 202 based on the input of the operator. For example, an operator at the remote control station 104 may tag the representation 436 of the target 202 multiple times and the remote control station 104 may identify a direction of the target 202 relative to the UAS 102 for each of the multiple tags. Tagging the representation 436 of the target 202 multiple times enables a location of the target 202 to be determined by triangulating target direction at different locations of the UAS 102. In some implementations, the UAS 102 may transmit location data of the UAS 102 (e.g., as determined by GPS or inertial measurement unit (IMU) sensors on the UAS 102) to the remote control station 104 and the remote control station 104 may determine a location of the target 202 based on the triangulated target direction at different locations of the UAS 102 and based on the location data of the UAS 102. In these implementations, the indication of the location 414 of the target 202 received by the UAS 102 from the remote control station corresponds to the location of the target 202. In other implementations, the remote control station 104 determines the target direction at different locations of the UAS 102, transmits the target direction data (e.g., an indication of the location 414 of the target 202) to the UAS 102, and the UAS 102 determines a location of the target 202 by triangulation based on the received target direction data and based on the location data of the UAS 102 (e.g., the GPS or IMU sensor data).

The control system 112 may determine the flight path 180 based on the location 414 and the parameters 408. For example, the location 414 of the target 202 may be defined by a latitude, a longitude, and an altitude above (or below) sea level. The control system 112 may determine the flight path 180 based on the latitude and the longitude of the target, the altitude above sea level of the target, and the parameters 408 as described above with reference to FIGS. 1-3.

FIG. 5 illustrates an example of a control diagram of example systems of the UAS 102 of FIG. 1 configured to communicate with the remote control station 104. The UAS 102 includes the control system 112. The control system 112 includes a guidance module 502, a navigation module 504, and a control module 506. The UAS 102 includes the lift and propulsion system 116. The lift and propulsion system 116 is controlled by the control system 112 to cause the UAS 102 to move according to the at least the portion 30 of the flight path 180 described above with reference to FIGS. 1-4 at the roll angle 32 described above with reference to FIGS. 1-4. The UAS 102 additionally includes an imaging system 522, a firing system 427 including a fire control module 512 and a safety 514, and the weapon 106. The guidance module 502, the navigation module 504, the control module 506, the imaging system 522, the fire control module 512, or a combination thereof, may be implemented using one or more circuits (e.g., one or more application-specific integrated circuits), one or more processors executing instructions, or a combination thereof.

The navigation module 504 may include a GPS module 528 and/or a sensor 526, such as an IMU. The imaging system 522 may include an optical sensor and an image processor, such as the sensor 422 and the image processor 426 described above with reference to FIG. 4. The imaging system 522 obtains image data of a scene including a target, such as the target 202 of FIGS. 2-4, and may process the data to identify the target 202 and/or to determine a location of the target 202 as described above with reference to FIG. 4. In some implementations, the imaging system 522 receives an indication of the target 202 from the remote control station 104 and processes the image data to determine a location of the indicated target.

In some implementations, the guidance module 502 is configured to receive flight parameter guidelines (e.g., engagement parameters), such as the flight parameter guidelines 416 of FIG. 4, and an indication of a target from the remote control station 104. The guidance module 502 is configured to receive information indicative of an orientation or a position of the UAS 102 from the navigation module 504. The guidance module 502 is additionally configured to receive data indicative of a location 414 of the target 202 from the imaging system 522. The guidance module 502 is configured to determine a flight path 180 that includes at least a portion 30 such that the aiming axis 114 of the weapon 106 is directed at the target 202 when the UAS 102 moves according to the at least the portion 30. For example, the guidance module 502 may receive the one or more first flight parameter guidelines described above with reference to FIGS. 1-4 (such as the flight parameter guidelines 416 of FIG. 4), and may determine the first parameters 413 relative to the target 202 as described above with reference to FIGS. 1-4. The guidance module 502 may determine the flight path 180 based on the determined first parameters 413 relative to the target 202 and based on the location 414 of the target 202 from the imaging system 522 as described above with reference to FIGS. 1-4. The guidance module 502 determines, based on the determined flight path 180 and the position of the UAS 102 from the navigation module 504, vehicle state information for the UAS 102 indicative of a desired state (e.g., a position, an orientation, or a velocity) of the UAS 102 to cause the UAS 102 to track (e.g., move according to) the determined flight path 180. The guidance module 502 provides the vehicle state information to the control module 506. The control module 506 receives the vehicle state information and the position information from the navigation module 504. The control module 506 determines control inputs to effectors of the lift and propulsion system 116 (e.g., motors coupled to rotors in a multi-rotor UAS) to cause the UAS 102 to move according to the desired state determined by the guidance module 502.

Thus, the guidance module 502 determines a flight path 180 based on information from the remote control station 104 indicative of engagement parameters and/or indicative of a target. The determined flight path 180 includes at least a portion 30 such that the aiming axis 114 of the weapon 106 is directed at the target 202 when the UAS 102 moves according to the at least the portion 30.

The guidance module 502 may be configured to course-correct the UAS 102 to address movement of the UAS 102 responsive to recoil from firing the weapon 106. For example, recoil from firing the weapon 106 may apply a force to the UAS 102, causing the UAS 102 to momentarily not be aimed at the target and/or to move off the flight path. The guidance module 502 may be configured to determine a desired state to cause the UAS 102 to return to the flight path after being moved responsive to the recoil. Additionally or alternatively, the guidance module 502 may be configured to course-correct the UAS 102 to account for wind and/or other disturbances.

Additionally, the UAS 102 includes a firing system 427 to fire the weapon 106 (e.g., based on input from the remote control station 104). For example, the remote control station 104 provides an indication of a firing mode of the weapon 106 (e.g., intermittent firing, semi-automatic mode, automatic mode) and provides a firing authorization to the fire control module 512. Upon receiving the firing authorization, the fire control module 512 disengages the safety 514. The fire control module 512 may re-engage the safety 514 when the firing authorization ends (e.g., upon firing the shot(s), after a timeout, or upon operator cancellation). The guidance module 502 may evaluate firing conditions to determine when the UAS 102 matches or satisfies a firing solution. When the guidance module 502 determines that the UAS 102 matches a firing solution, the guidance module 502 provides an indication to the fire control module 512 indicating that the UAS 102 matches a firing solution. When the guidance module 502 provides the indication to the fire control module 512 that the UAS 102 matches a firing solution and the safety 514 is disengaged, the fire control module 512 provides a firing instruction or control command to fire the weapon 106, thereby firing the weapon 106 at the target.

Recoil from firing the weapon 106 may apply a force to the UAS 102, causing the UAS 102 to momentarily not be aimed at the target. During the time period when the UAS 102 is experiencing or recovering from the recoil-induced movement of the UAS 102, the guidance module 502 may determine that the UAS 102 does not match or satisfy a firing solution. During this period, the guidance module 502 does not provide the indication that the UAS 102 matches a firing solution to the fire control module 512, thereby preventing firing of the weapon 106. When the UAS 102 recovers from the recoil-induced movement (e.g., when the UAS 102 is once again moving along the flight path 180 at the roll angle 32), the guidance module 502 may determine that the UAS 102 matches or satisfies the firing solution, causing the guidance module 502 to provide the indication that the UAS 102 matches or satisfies the firing solution to the fire control module 512, thereby disengaging the safety 514.

Thus, the UAS 102 is configured to determine a firing solution to fire at the target 202 and to determine whether the UAS 102 matches or satisfies a firing solution. The UAS 102 is configured not to fire the weapon 106 until the UAS 102 determines that the UAS 102 matches or satisfies the firing solution.

Figure 6:
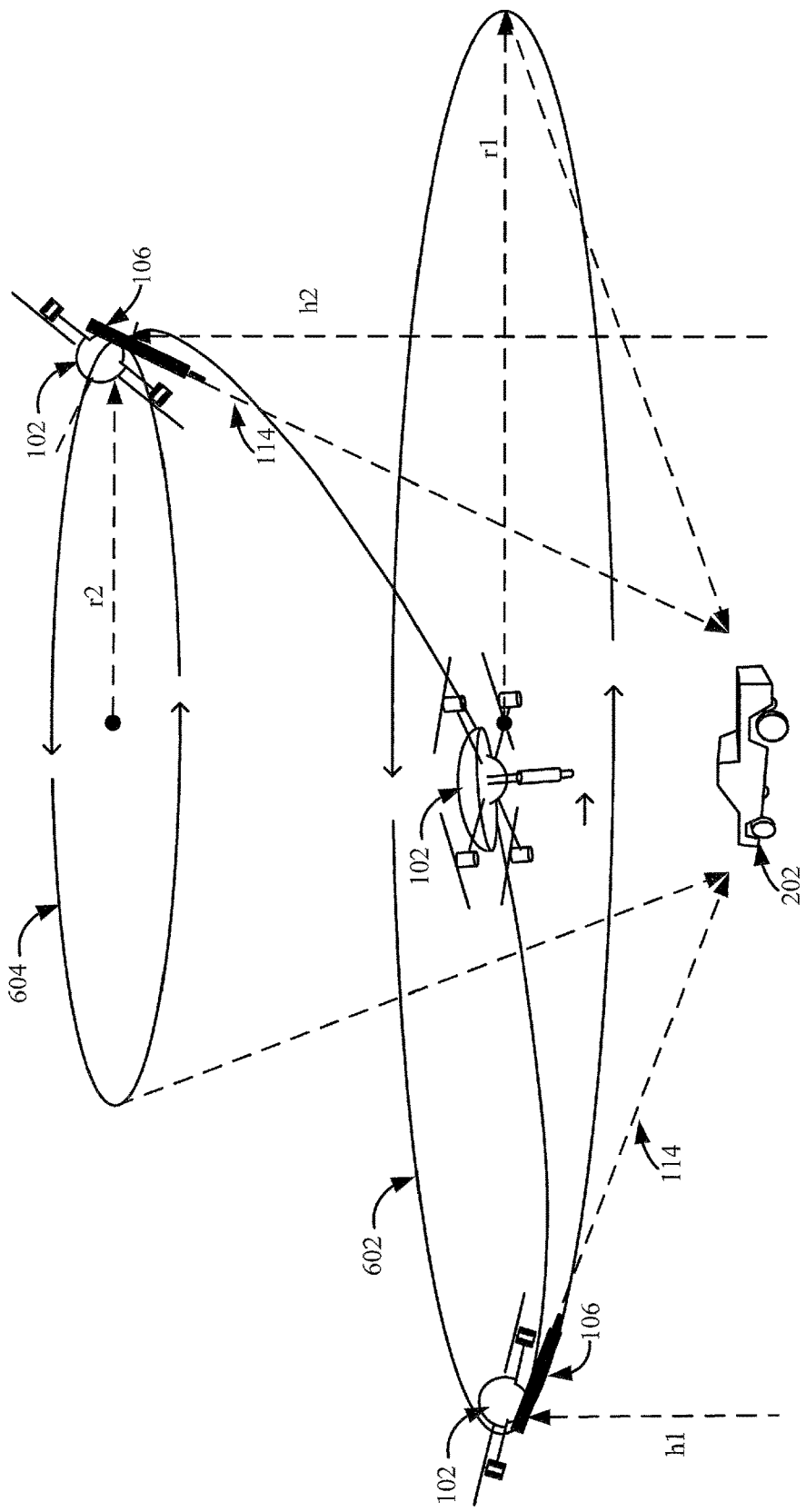
FIG. 6 illustrates graphical representations of multiple examples of the flight path of FIG. 1 about a target and illustrates a UAS moving according to the multiple examples of the flight path and transitioning between the multiple examples of the flight path.

FIG. 6 illustrates a graphical representation 602 of a third example of a flight path 180 of FIG. 1 and a graphical representation 604 of a fourth example of a flight path 180 of FIG. 1. The fourth example of the flight path 180 may correspond to an evasive flight path about a target 202. The third example of the flight path 180 and the fourth example of the flight path 180 are circular about the target 202. The aiming axis 114 of the weapon 106 as the UAS 102 moves according to the third example of the flight path 180 is, at every point along the third example of the flight path 180, substantially perpendicular to the flight vector direction of the UAS 102 and directed at the target 202. Additionally, the aiming axis 114 of the weapon 106 as the UAS 102 moves according to the fourth example of the flight path 180 is, at every point along the fourth example of the flight path 180, substantially perpendicular to the flight vector direction of the UAS 102 and directed at the target 202. The third example of the flight path 180 has an altitude of h1 and an orbit radius of r1. The fourth example of the flight path 180 has an altitude of h2 (where h2 is greater than h1) and an orbit radius of r2 (where r2 is less than r1).

The third example of the flight path 180 may correspond to a flight path according to which the UAS 102 is to move before the UAS 102 moves according to the fourth example of the flight path 180. The UAS 102 may determine and transition between moving according to the third example of the flight path 180 and moving according to the fourth example of the flight path 180 as an evasive maneuver, e.g., to make the UAS 102 harder to detect or attack. The altitudes h1 and h2 and orbit radii r1 and r2 for the third example of the flight path 180 and the fourth example of the flight path 180 may be determined by the UAS 102.

For example, the UAS 102 may be configured to determine and transition between the third example of the flight path 180 and the fourth example of the flight path 180 by determining the altitudes h1 and h2 and the orbit radii r1 and r2 based on flight parameter values selected from a range of flight parameter values defined by one or more flight parameter guidelines as described above. To illustrate using an example described above, one or more altitude parameter guidelines may define an altitude range of 300-450 feet (91.4-137.2 m) above the target 202. In this example, the UAS 102 may determine the third example of the flight path 180 using an altitude of 300 feet (91.4 m) and may determine the fourth example of the flight path 180 using an altitude of 450 feet (137.2 m) as described above with reference to FIG. 1. Thus, the UAS 102 may be configured to determine and transition between multiple flight paths by selecting different flight parameter values within a range of flight parameter values determined by one or more flight parameter guidelines.

Alternatively or additionally, in some examples, a remote control station (e.g., an operator of the UAS 102), such as the remote control station 104 of FIGS. 4 and 5, adjusts a flight parameter guideline or provides an updated flight parameter guideline during an engagement (e.g., while moving according to the third example of the flight path 180), causing the UAS 102 to determine and/or transition to a different flight path (e.g., the second example of the flight path 180). Thus, the UAS 102 may be configured to determine and transition between multiple flight paths based on adjusted or new flight parameter guidelines received during an engagement.

Alternatively or additionally, the one or more flight parameter guidelines may include multiple flight parameter guidelines that are stored by the UAS 102. For example, the UAS 102 may store a first altitude parameter guideline of 300 feet (91.4 m) and may determine the third example of the flight path 180 using the first altitude parameter guideline as described above with reference to FIG. 1. The UAS 102 may additionally store a second altitude parameter guideline of 450 feet (137.2 m) and may determine the fourth example of the flight path 180 using the second altitude parameter guideline. Thus, the UAS 102 may store different parameter guidelines for use in determining multiple flight paths.

Thus, the UAS 102 may determine, transition between, and/or move according to multiple flight paths such that the aiming axis 114 is directed at the target when the UAS 102 moves according to at least a portion of each of the multiple flight paths. Transitioning between and moving according to the multiple flight paths may make to the UAS 102 harder to detect and/or attack.

Alternatively or additionally, the third example of the flight path 180 may be a flight path that the UAS 102 moves according to while a different UAS moves according to the fourth example of the flight path 180. In this example, the different UAS may be configured as described with reference to the UAS 102 such that the aiming axis of the weapon of the different UAS is, at every point along the fourth example of the flight path 180, directed at the target 202. Although the cooperative attack is illustrated using two UAS's, the cooperative attack may be performed by more than two (e.g., N) UAS's using more than two (e.g., N) flight paths. Each of the N flight paths is determined to have different flight parameters (e.g., different altitudes or ground ranges) than the other UAS's relative to the target such that an aiming axis of a UAS moving according to the flight path is directed at the target 202 at every point along the flight path and such that the aiming axis of the UAS maintains a sufficient distance from (e.g., does not intersect) the other N flight paths (e.g., such that the aiming axis of the UAS is not directed at any of the other N UAS's as the UAS moves according to the flight path). Thus, the third example of the flight path 180 and the fourth example of the flight path 180 may enable cooperative attack (e.g., by the UAS 102 and the different UAS) of the target 202 without friendly interference. Multiple UAS's may therefore determine, and concurrently move according to, respective flight paths to cooperatively attack a target.

Figure 7:
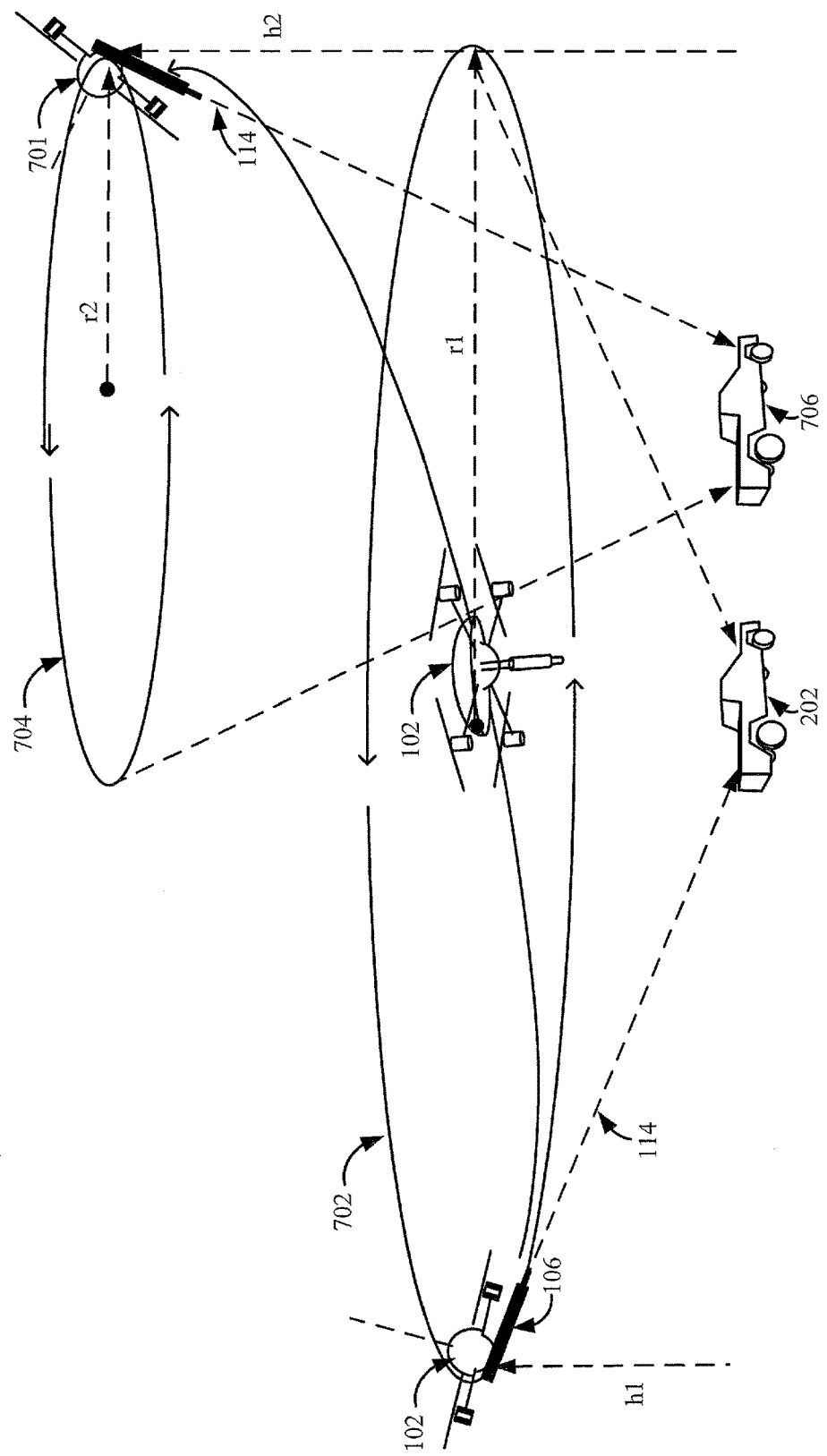
FIG. 7 illustrates graphical representations of multiple examples of the flight path of FIG. 1 about one or more targets and illustrates a UAS moving according to the multiple examples of the flight path and transitioning between the multiple examples of the flight path.

FIG. 7 illustrates graphical representations 702, 704 of fifth and sixth examples, respectively, of the flight path 180 of FIG. 1 about one or more targets 202, 706. FIG. 7 also illustrates the UAS 102 transitioning between and moving according to the fifth example of the flight path 180 and according to the sixth example of the flight path 180. For example, the one or more targets 202, 706 may include a single target at different positions. Alternatively, the one or more targets 202, 706 may include multiple targets, where the targets are at different positions. The fifth and sixth examples of the flight path 180 are circular or semi-circular. The aiming axis 114 of the weapon 106 as the UAS 102 moves according to the fifth example of the flight path 180 is directed at the target 202. Additionally, the aiming axis 114 of the weapon 106 as the UAS 102 moves according to the sixth example of the flight path 180 is directed at the target 706. The fifth example of the flight path 180 has an altitude of h1 and an orbit radius of r1. The sixth example of the flight path 180 has an altitude of h2 (where h2 is greater than h1) and an orbit radius of r2 (where r2 is less than r1). The fifth example of the flight path 180 may have a different center than the sixth example of the flight path 180. The fifth example of the flight path 180 may correspond to a flight path according to which the UAS 102 is to move before the UAS 102 moves according to the sixth example of the flight path 180. The altitude h1 and the orbit radius r1 may be determined based on one or more received or stored first parameter guidelines as described above with reference to the first parameter guidelines described with reference to FIG. 1. The sixth example of the flight path 180 may be executed to track the target as the target changes position. Alternatively, the sixth example of the flight path 180 may be executed to aim at a different target than the target associated with the fifth example of the flight path 180. The altitude h2 and the orbit radius r2 may be determined based on one or more second received or stored parameter guidelines corresponding to evasive maneuver parameters as described above with reference to the one or more received or stored first parameter guidelines described with reference to FIG. 1.

Thus, the UAS 102 may determine, transition between, and move according to, multiple flight paths having different centers to track a moving target or to target different targets. As the UAS 102 moves according to each of the fifth and sixth examples of the flight path 180, the aiming axis 114 of the weapon 106 is directed at the corresponding target 202, 706.

Figure 9:
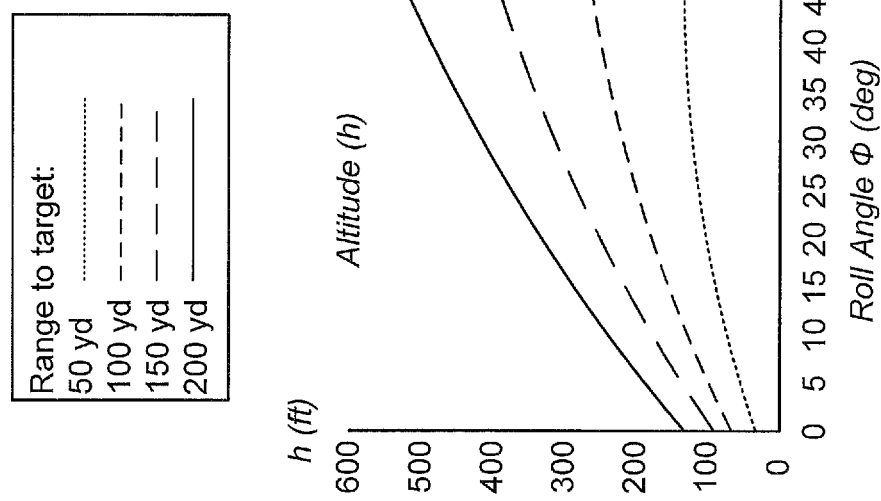
FIG. 9 illustrates example plots of an orbit radius parameter (y axis) versus roll angle (x axis) for the UAS of FIG. 1.
Figure 8:
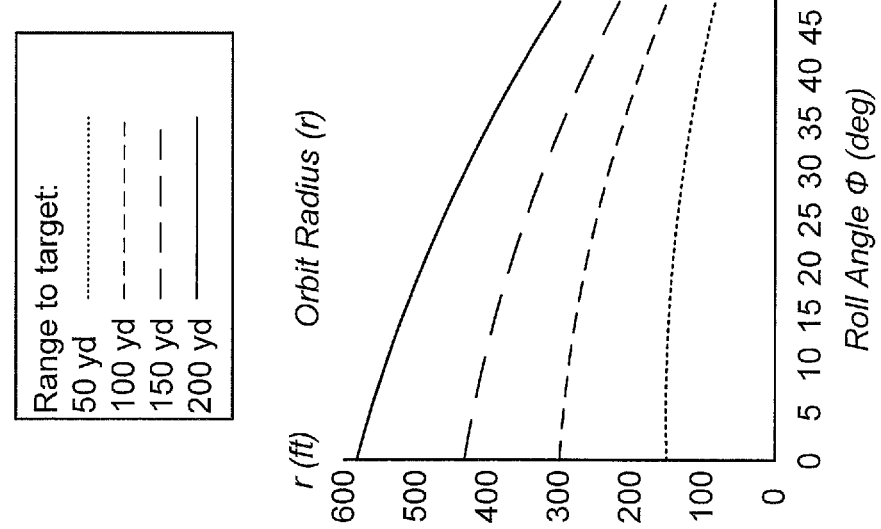
FIG. 8 illustrates example plots of an altitude parameter (y axis) versus roll angle (x axis) for the UAS of FIG. 1.

FIGS. 8 and 9 illustrate plots of first parameters given different ranges (to a target) and roll angles for a UAS that has a weapon having a declination angle of 12 degrees. The solid lines in FIGS. 8 and 9 correspond to a UAS at a range (to a target) of 200 yards (182.9 m). The largest dashed lines in FIGS. 8 and 9 correspond to a UAS at a range (to a target) of 150 yards (137.1 m). The intermediate dashed lines in FIGS. 8 and 9 correspond to a UAS at a range (to a target) of 100 yards (91.4 m). The smallest dashed lines in FIGS. 8 and 9 correspond to a UAS at a range (to a target) of 50 yards (45.7 m).

FIG. 8 illustrates plots of the altitude parameter (y axis) of the first parameters described above versus roll angle (x axis) of the UAS 102. As illustrated in FIG. 8, the altitude parameter for a given range to target increases as the roll angle increases. For example, for a UAS at a range of 200 yards (182.9 m) from the target and at a roll angle of five degrees, the altitude parameter corresponds to approximately 185 feet (56.4 m) above a target. For a UAS at a range of 200 yards (182.9 m) from the target and at a roll angle of 45 degrees, the altitude parameter corresponds to approximately 517 feet (157.6 m) above the target. Additionally, as illustrated in FIG. 8, for a constant roll angle, the altitude parameter decreases as the range to the target decreases. For example, for a UAS at a range of 150, 100, and 50 yards (or 137.2, 91.4, and 45.7 m, respectively) from the target and at a roll angle of five degrees, the altitude parameter corresponds to approximately 133 feet (40.5 m), 100 feet (30.5 m), and 50 feet (15.2 m), respectively.

FIG. 9 illustrates plots of the orbit radius parameter (y axis) of the first parameters described above versus roll angle (x axis) of the UAS 102. As illustrated in FIG. 9, the orbit radius parameter for a given range to target decreases as the roll angle increases. For example, for a UAS at a range of 200 yards (182.9 m) from the target and at a roll angle of five degrees, the orbit radius parameter corresponds to approximately 570 feet (173.7 m). For a UAS at a range of 200 yards (182.9 m) from the target and at a roll angle of 45 degrees, the orbit radius parameter corresponds to approximately 315 feet (96 m). Additionally, as illustrated in FIG. 9, for a constant roll angle, the orbit radius parameter decreases as the range to the target decreases. For example, for a UAS at a range of 150, 100, and 50 yards (or 137.2, 91.4, and 45.7 m, respectively) from the target and at a roll angle of five degrees, the orbit radius parameter corresponds to approximately 420 feet (128 m), 285 feet (86.9 m), and 150 feet (45.7 m), respectively.

Figure 10:
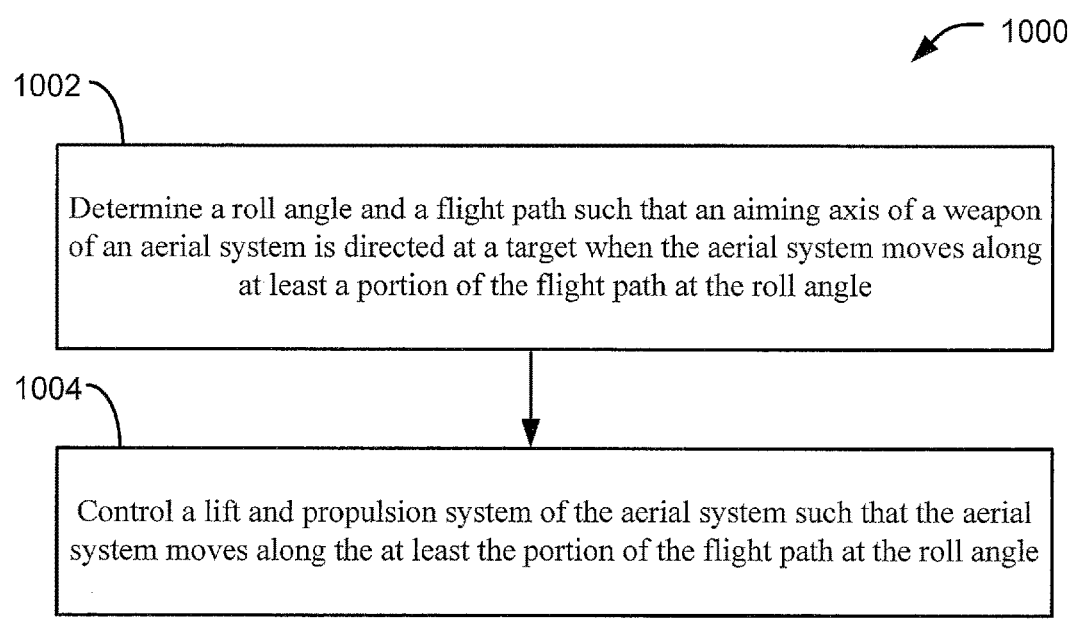
FIG. 10 is a flow chart that illustrates a particular example of a method of aiming the weapon of the UAS at the target.

FIG. 10 illustrates a method 1000 of aiming a fixed-position weapon of a UAS by banking or rolling the UAS at a determined angle when the UAS moves according to a determined flight path (or a portion thereof). The method 1000 of FIG. 10 may be performed by the UAS 102 of FIGS. 1 and 4.

The method 1000 includes, at 1002, determining, by a control system of an unmanned aerial system (UAS), a roll angle and a flight path such that an aiming axis of a weapon of the UAS is directed at a target when the UAS moves according to at least a portion of the flight path at the roll angle. The control system may correspond to the control system 112 of FIGS. 1 and 4. The weapon may correspond to the weapon 106 of FIGS. 1 and 2, and the aiming axis may correspond to the aiming axis 114 of FIGS. 1 and 2. The flight path may correspond to the flight path 180 described above with reference to FIGS. 1-9. To illustrate, in some examples, the flight path is a complete circle, in which case the at least the portion of the flight path corresponds to an entire circle as described above with reference to FIGS. 1 and 2 (as well as with reference to the third, fourth, fifth, and sixth examples of the flight path 180 described above with reference to FIGS. 6 and 7). Alternatively or additionally, the flight path may include a circular portion (e.g., a semi-circular portion) and a non-circular portion, such as the second portion 311 described above with reference to FIGS. 1 and 3, in which case the at least the portion corresponds to the circular portion 342.

The roll angle may correspond to the roll angle 32 described above with reference to FIGS. 1-9. The control system 112 may determine the roll angle as described above with reference to FIGS. 1 and 4. The control system 112 may determine the at least the portion of the flight path based on determined parameters that the UAS is to maintain relative to the target while the UAS moves according to the at least the portion of the flight path (e.g., the first parameters described above) and based on a location of the target as described above with reference to FIGS. 1, 4, and 5. In some implementations, the determined parameters are determined based at least in part on one or more received or stored flight parameter guidelines that include a minimum altitude parameter guideline indicative of a minimum altitude relative to the target, a minimum range parameter guideline indicative of a minimum range to the target, a minimum orbit radius parameter guideline indicative of a minimum orbit radius centered at the target, a minimum velocity parameter guideline indicative of a minimum velocity for the UAS, or a combination thereof, as described above with reference to FIGS. 1, 4, and 5.

In some implementations, the method 1000 further includes determining the physical location of the target. Determining the physical location may include the control system receiving an indication of the physical location of the target from a remote control station. The remote control station may correspond to the remote control station 104 described above with reference to FIGS. 4 and 5.

In some implementations, the method 1000 further includes obtaining, by the UAS, image data of a scene including the target. The image data may correspond to the image data 424 described above with reference to FIG. 4. In these implementations, the physical location is determined by the UAS based on the image data as described above with reference to FIG. 4.

In some implementations, the method 1000 further includes transmitting, by the UAS to the remote control station, the image data of the scene including the target. In some of these implementations, the method 1000 further includes receiving an indication of a physical location of the target from a remote control station that includes a display configured to display an image that is generated based on the image data. The physical location may be determined based on input from an operator at the display (e.g., the display 432 of FIG. 4) as described above with reference to FIG. 4. For example, the input may include a location of a portion of a display touched by the operator or a position of a cursor on the display as described above with reference to FIG. 4. In some implementations, the method 1000 further includes determining, by the control system, the at least the portion of the flight path at least in part based on the indication.

The method 1000 includes, at 1004, controlling a lift and propulsion system of the UAS such that the UAS moves according to the at least the portion of the flight path at the roll angle. For example, the control system 112 may control the lift and propulsion system 116 of FIGS. 4 and 5 as described above with reference to FIGS. 1-5.

Figure 11:
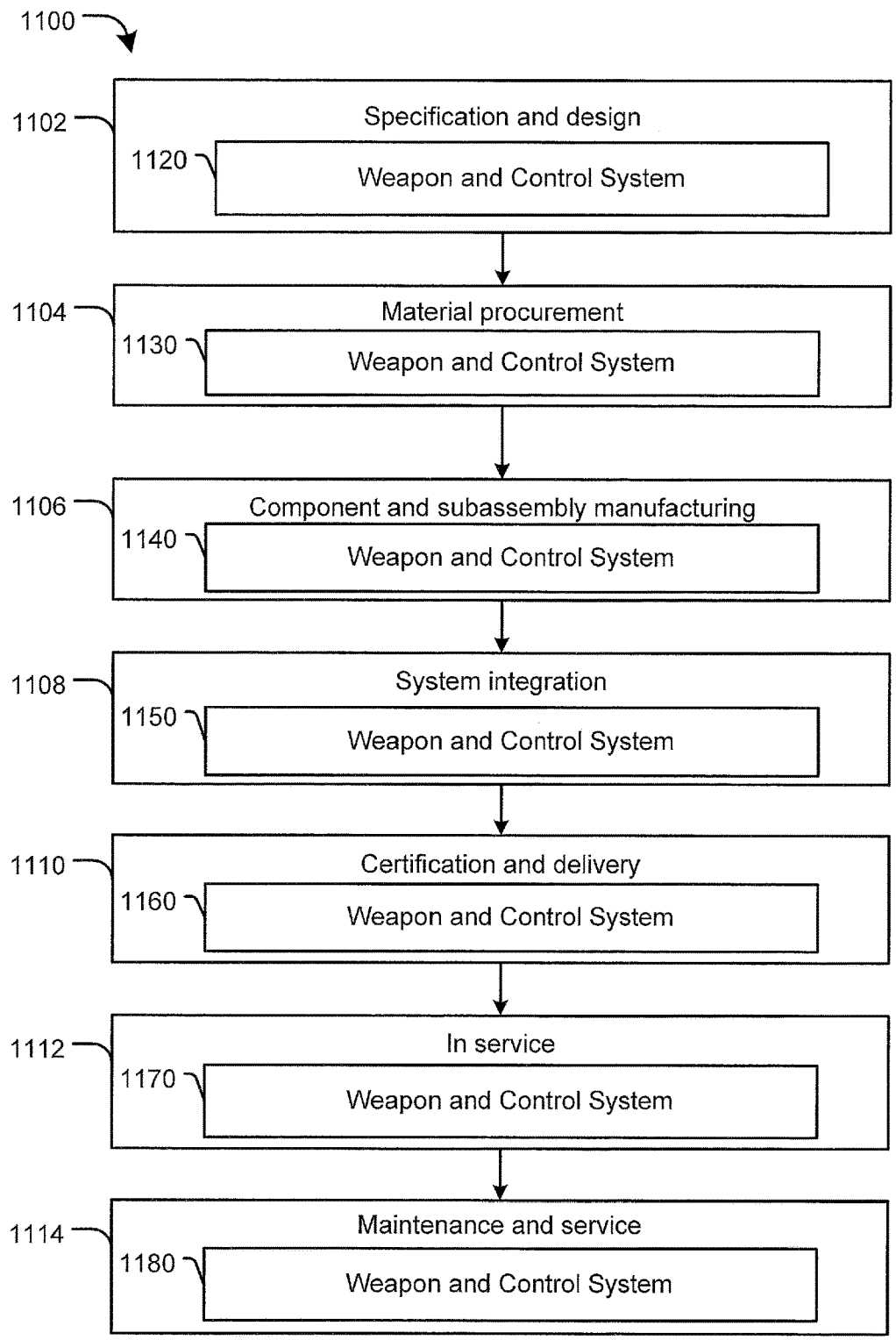
FIG. 11 is a flow chart illustrative of a life cycle of an aircraft that includes the weapon and the control system of FIG. 1.

Referring to FIG. 11, a flowchart illustrative of a life cycle of a UAS including a fixed-position weapon and a control system configured to determine a roll angle and a flight path such that an aiming axis of the weapon is directed at a target as the UAS moves according to the flight path at the roll angle. During pre-production, the exemplary method 1100 includes, at 1102, specification and design of a UAS, such as the UAS 102 described with reference to FIG. 12. During specification and design of the UAS, the method 1100 may include, at 1120, specification and design of a weapon and a control system. The weapon may correspond to the weapon 106 of FIG. 1 and the control system may correspond to the control system 112 of FIGS. 1 and 4. At 1104, the method 1100 includes material procurement. At 1130, the method 1100 includes procuring materials for the weapon and the control system.

During production, the method 1100 includes, at 1106, component and subassembly manufacturing and, at 1108, system integration of the platform. The method 1100 may include, at 1140, component and subassembly manufacturing (e.g., producing the weapon) and, at 1150, system integration of the weapon and the control system. For example, the weapon may be mounted on the UAS using a fixed-position mount as described above with reference to the fixed-position mount 122 of FIG. 1. Additionally, one or more processors configured to perform the control system operations described above with reference to the control system 112 of FIGS. 1 and 4 may be integrated into the UAS. At 1110, the method 1100 includes certification and delivery of the UAS and, at 1112, placing the UAS in service. Certification and delivery may include, at 1160, certifying the weapon and the control system. At 1170, the method 1100 includes placing the UAS in service. While in service by a customer, the UAS may be scheduled for routine maintenance and service (which may also include modification, reconfiguration, refurbishment, and so on). At 1114, the method 1100 includes performing maintenance and service on the UAS. At 1180, the method 1100 includes performing maintenance and service of the weapon and the control system. For example, maintenance and service of the weapon and the control system may include cleaning the weapon.

Each of the processes of the method 1100 may be performed or carried out by a system integrator, a third party, and/or an operator (e.g., a customer). For the purposes of this description, a system integrator may include without limitation any number of manufacturers and major-system subcontractors; a third party may include without limitation any number of venders, subcontractors, and suppliers; and an operator may be an airline, a leasing company, a military entity, a service organization, and so on.

Figure 12:
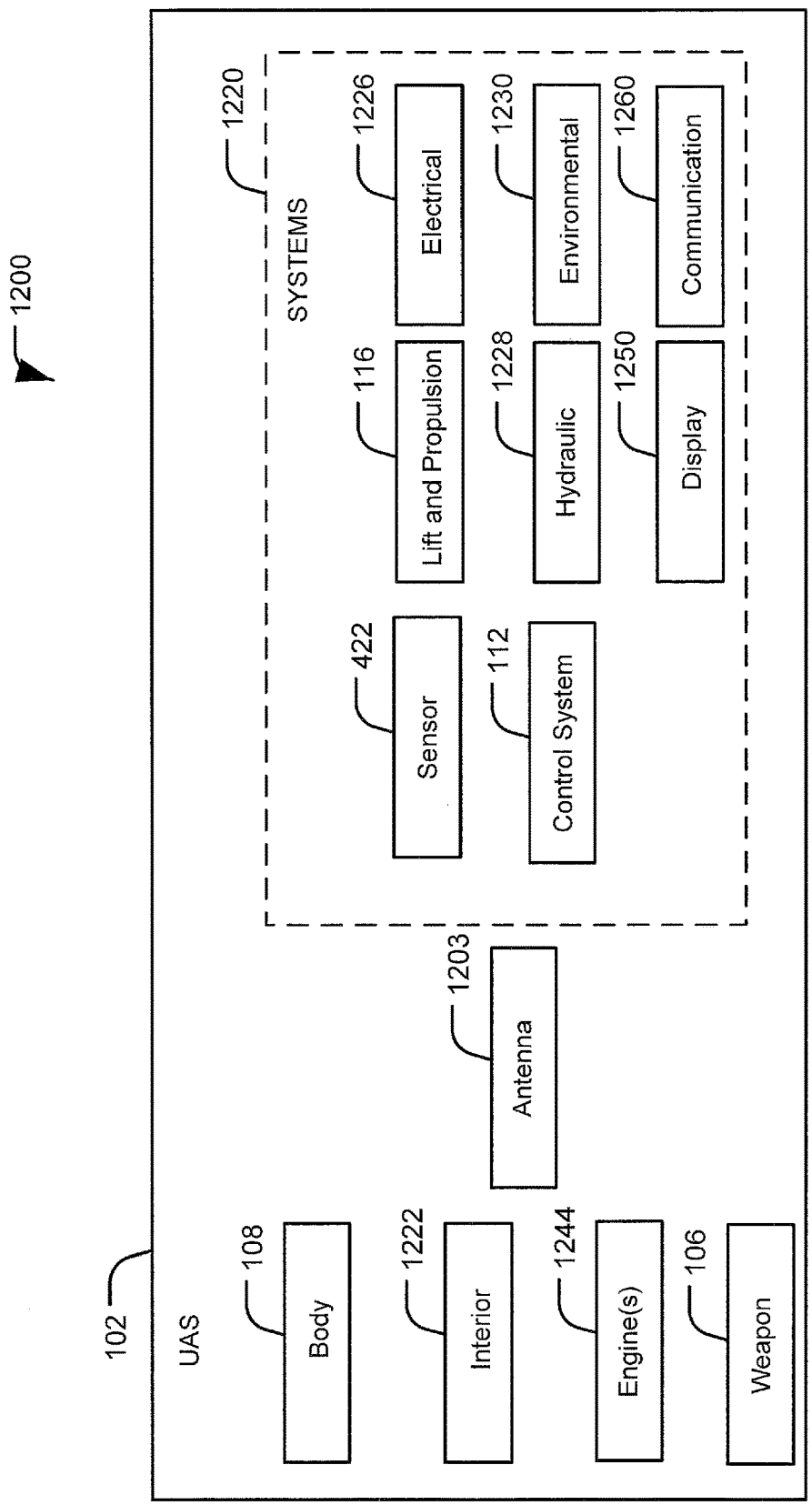
FIG. 12 is a block diagram of an illustrative embodiment of an aircraft that includes the weapon and the control system of FIG. 1.

Referring to FIG. 12, a block diagram of an illustrative embodiment of a UAS 102 that includes a weapon 106 and a control system 112 configured to determine a roll angle and a flight path such that an aiming axis of the weapon 106 is directed at a target while the UAS 102 moves according to at least a portion of the flight path is shown and designated 1200. As shown in FIG. 12, the UAS 102 may include a body 108, an interior 1222, one or more engines (and/or electric motors) 1244, an antenna 1203, the weapon 106, and a plurality of systems 1220. The systems 1220 may include one or more of a lift and propulsion system 116, an electrical system 1226, a hydraulic system 1228, an environmental system 1230, a display system 1250, and a communication system 1260. Any number of other systems may be included. The antenna 1203 may be part of the communication system 1260 and the one or more engines (and/or electric motors) 1244 may be part of the lift and propulsion system 116.

Apparatus and methods embodied herein may be employed during any one or more of the stages of the method 1000. For example, components or subassemblies corresponding to the production process 1106 may be fabricated or manufactured in a manner similar to components or subassemblies produced while the UAS 102 is in service, for example at 1112. Also, one or more of apparatus embodiments, method embodiments, or a combination thereof may be utilized while the UAS 102 is in service, at 1112 for example and without limitation, to maintenance and service, at 1114.

Embodiments described above with reference to a UAS may also be implemented or performed in or by one or more manned aerial systems (e.g., such as an attack helicopter). The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. An unmanned aerial system (UAS) comprising:
   a body;
   a lift and propulsion system coupled to the body;
   a weapon coupled to the body and having an aiming axis oriented in a fixed direction relative to the body; and
   a control system operatively coupled to the lift and propulsion system and the weapon, the control system configured to:
      determine a roll angle and a flight path so the aiming axis is directed at a target when the UAS moves according to at least a portion of the flight path at the roll angle, wherein the aiming axis is side-facing; and
      control the lift and propulsion system so the UAS moves according to the at least the portion of the flight path at the roll angle.

2. The UAS of claim 1, wherein the control system is configured to:
   receive one or more indicators of one or more flight parameter guidelines;
   determine, based at least in part on the one or more flight parameter guidelines, parameters that the UAS is to maintain relative to the target while the UAS moves according to the at least the portion of the flight path; and
   determine the at least the portion of the flight path at least in part based on the determined parameters.

3. The UAS of claim 2, wherein the one or more flight parameter guidelines include a minimum altitude parameter guideline indicative of a minimum altitude relative to the target, a minimum range parameter guideline indicative of a minimum range to the target, a minimum orbit radius parameter guideline indicative of a minimum orbit radius centered at the target, a minimum velocity parameter guideline indicative of a minimum velocity for the UAS, or a combination thereof.

4. The UAS of claim 2, wherein the control system is further configured to:
   receive an indication of a location of the target; and
   determine the at least the portion of the flight path based at least in part on the location of the target and the determined parameters.

5. The UAS of claim 1, wherein the lift and propulsion system includes at least three rotors.

6. The UAS of claim 1, wherein the weapon includes a firearm.

7. The UAS of claim 1, further comprising a sensor coupled to the body and configured to obtain image data, wherein the control system is configured to:
   determine a physical location of the target based on the image data; and
   determine the at least the portion of the flight path based at least in part on the location of the target and determined parameters that the UAS is to maintain relative to the target while the UAS moves according to the at least the portion of the flight path.

8. The UAS of claim 7, wherein the control system is configured to receive an indication of the target from a remote control station and to determine the physical location of the target based on the indication and the image data.

9. A system for aiming at a target, the system comprising:
   a remote control station configured to display an image to an operator and to receive an input from the operator indicating that the image includes a representation of a target to generate an indication of a physical location of the target; and
   an unmanned aerial system (UAS) comprising:
      a body;
      a lift and propulsion system coupled to the body;
      a weapon coupled to the body and having an aiming axis oriented in a fixed direction relative to the body; and
      a control system operatively coupled to the lift and propulsion system and the weapon, the control system configured to:
         receive the indication of the physical location of the target from the remote control station;
         determine, based at least in part on the indication of the physical location of the target, a roll angle and a flight path so the aiming axis is directed at the target when the UAS moves according to at least a portion of the flight path at the roll angle, wherein the aiming axis is side-facing; and
         control the lift and propulsion system so the UAS moves according to the at least the portion of the flight path at the roll angle.

10. The system of claim 9, wherein the weapon includes a firearm, and wherein the lift and propulsion system includes at least three rotors.

11. The system of claim 9, wherein the UAS further comprises a sensor coupled to the body and configured to obtain image data, wherein the UAS is configured to transmit the image data to the remote control station, and wherein the remote control station is configured to process the image data to generate the image.

12. A method comprising:
   determining, by a control system of an unmanned aerial system (UAS), a roll angle and a flight path so an aiming axis of a weapon of the UAS is directed at a target when the UAS moves according to at least a portion of the flight path at the roll angle, wherein the weapon is coupled to a body of the UAS so the aiming axis is oriented in a fixed direction relative to the body, and wherein the aiming axis is side-facing; and controlling a lift and propulsion system of the UAS so the UAS moves according to the at least the portion of the flight path at the roll angle.

13. The method of claim 12, further comprising determining a physical location of the target, wherein the at least the portion of the flight path is determined based at least in part on the physical location of the target and determined parameters that the UAS is to maintain relative to the target while the UAS moves according to the at least the portion of the flight path.

14. The method of claim 13, wherein the determined parameters are determined based at least in part on one or more received or stored flight parameters that include a minimum altitude relative to the target, a minimum range to the target, a minimum orbit radius centered at the target, a minimum velocity of the UAS, or a combination thereof.

15. The method of claim 13, wherein determining the physical location of the target includes receiving an indication of the physical location from a remote control station.

16. The method of claim 13, further comprising obtaining, by the UAS, image data of a scene including the target, wherein the physical location is determined by the UAS based on the image data.

17. The method of claim 12, further comprising:

transmitting, by the UAS to a remote control station, image data of a scene including the target;

receiving an indication of a physical location of the target from a remote control station that includes a display configured to display an image that is generated based on the image data, the physical location determined based on input from an operator at the display; and determining, by the control system, the at least the portion of the flight path at least in part based on the indication.

18. The method of claim 17, wherein the input includes a location of a portion of a display touched by the operator or a position of a cursor on the display.

19. The UAS of claim 1, wherein the aiming axis is perpendicular to a flight vector direction of the UAS, and wherein the at least the portion of the flight path comprises a portion of a circle.

20. The UAS of claim 1, wherein the UAS is set to maintain a constant distance from the target, a constant altitude relative to the target, a constant ground range relative to the target, or a combination thereof, when the UAS moves according to the at least the portion of the flight path.

* * * * *